L. FRIEDMAN.
DEMOUNTABLE RIM.
APPLICATION FILED MAR. 19, 1919.
1,332,121. Patented Feb. 24, 1920.
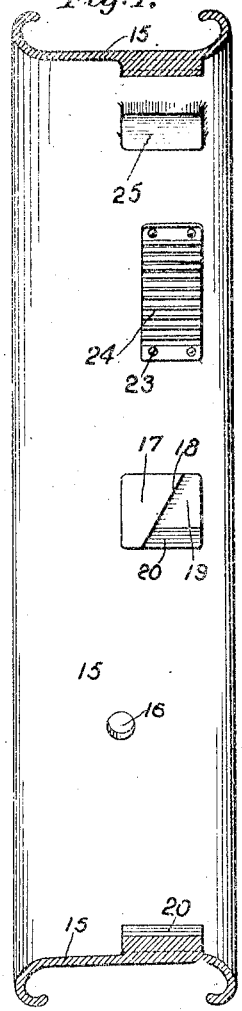
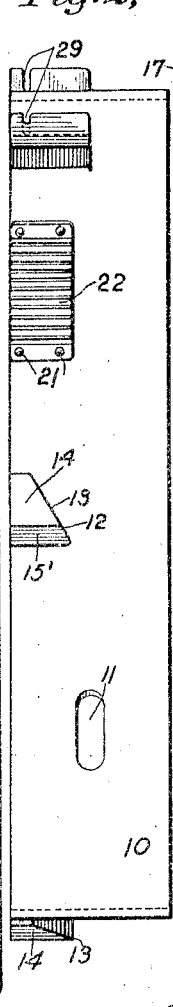
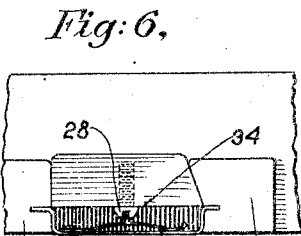
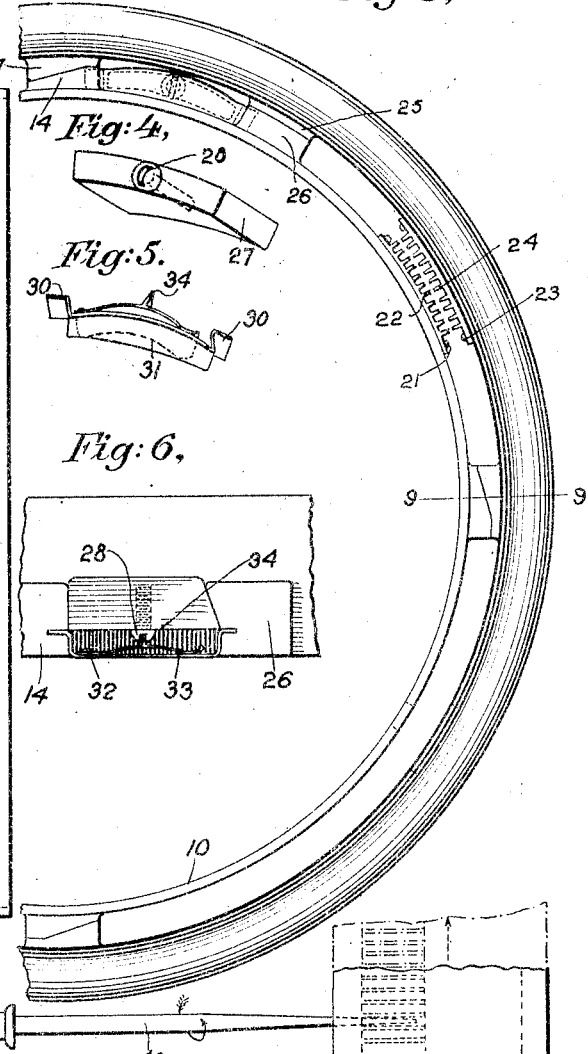
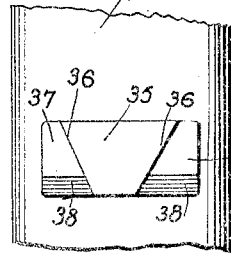
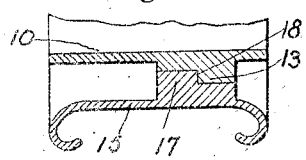
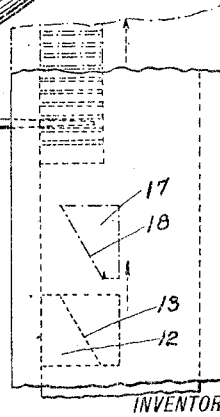
INVENTOR
Louis Friedman,
BY
ATTORNEYS
WITNESSES

UNITED STATES PATENT OFFICE.

LOUIS FRIEDMAN, OF NEW YORK, N. Y.

DEMOUNTABLE RIM.

1,332,121.   Specification of Letters Patent.   Patented Feb. 24, 1920.

Application filed March 19, 1919. Serial No. 283,489.

*To all whom it may concern:*

Be it known that I, LOUIS FRIEDMAN, a citizen of the United States, and a resident of the city of New York, borough of Manhattan, in the county and State of New York, have invented a new and Improved Demountable Rim, of which the following is a full, clear, and exact description.

The present invention relates to new and useful improvements in wheels for vehicles, and pertains more particularly to means for securing tires thereto.

The invention is particularly adaptable to wheels of the demountable rim type, and has for its primary object to provide a construction which will permit of a ready attachment and removal of the demountable rim.

A further object of the invention is to provide means by which the rim is given a movement circumferentially of the wheel to tighten the rim thereon.

A further object of the invention is to provide means by which circumferential movement of the rim after the same has been positioned is prevented.

A further object of the invention is to provide means by which the rim when positioned is prevented from sidewise movement and consequent removal from the wheel.

A still further object of the invention is to provide means by which the rim is moved circumferentially of the wheel to tighten the same thereon.

With the above and other objects in view, reference is had to the accompanying drawings in which Figure 1 is a sectional view of a demountable rim constructed in accordance with the present invention;

Fig. 2 is a view in elevation of the wheel felly;

Fig. 3 is a side view of a portion of the wheel;

Fig. 4 is a detail view of the locking member;

Fig. 5 is a detail view;

Fig. 6 is a detail view showing the locking member in place;

Fig. 7 is a diagrammatic view showing the method of disassembling the wheel and rim;

Fig. 8 is a detail view;

Fig. 9 is a transverse view on the line 9—9 of Fig. 3.

Referring more particularly to the drawings, the reference character 10 designates a fixed rim, said rim being provided with an elongated slot 11 for the reception of the inflating valve of a pneumatic tire. Positioned around the periphery of the fixed rim 10, are projecting members 12, and said projecting members 12 are provided with an angularly disposed inner face 13, and an inclined outer face 14. This inclined face 14 terminates in a face 15' angularly disposed with respect thereto.

The reference character 15 designates a demountable rim, said rim being provided with a circular valve-receiving opening 16. Secured to the demountable rim 15 on its inner face, are a plurality of spaced members 17, and said spaced members 17 are each provided with an angularly disposed wall 18. The reference character 19 designates an inclined face which terminates in a surface 20, which surface is parallel to the arc of the demountable rim.

Secured to the fixed rim 10 by means of rivets or the like 21, is a rack member 22, and secured to the inner face of the demountable rim by rivets 23, is a rack member 24. While these rack members 22 and 24 are shown as secured in place by means of rivets, it is to be understood that spot welding or any other suitable means may be employed for attaching said rack members, or, if desired, said rack members may be formed directly in the material from which the fixed rim and demountable rim are formed.

The reference character 25 designates a rectangular projection which is formed on the inner face of the felly 10, and said projection 25 is so positioned with relation to the projections 17 as to fall opposite to a projection 26 carried by the fixed rim 10, when the demountable rim has been properly positioned with respect thereto. The reference character 27 designates a block which is adapted to be interposed between the projections 25 and 26 and the next adjacent projections 14 and 17, and said block is secured in place by means of a screw 28. One end of the block 27 and the adjacent end of the projection 12, are provided with notches 29, and adapted to be received within said notches are the wings 30 of a resilient member 31. Secured to the resilient member 31, by means of a rivet or the like 32, is a spring 33, and intermediate of its ends, said spring is provided with a projecting tongue 34, which is adapted to be received within the eye of the screw member 28 to prevent turning thereof.

In assembling the device, the demountable rim 15 is slipped over the fixed rim 10 of the wheel in such a manner that the two racks 22 and 24 will be opposite each other, as shown in Fig. 3. A suitable tool 40 is now engaged with the teeth of the rack members 22 and 24, and if such tool be turned in a direction opposite to that indicated by the arrow in Fig. 7, it will be seen that the inclined faces 19 of the projecting members 17 will ride up the inclined faces 14 of the projecting members 12, and cause the demountable rim to be rigidly retained by the fixed rim. During this operation, the angularly disposed wall 18 of the projecting members 17 of the demountable rim 15 will ride behind the angularly disposed wall 13 of the projecting members 12, as shown by dotted lines in Fig. 7, thus preventing a lateral displacement of the demountable rim 15 with respect to the fixed rim 10.

In Fig. 8 is shown a slightly modified form of the invention, and in this form the rim 15 is provided with a plurality of projecting members 35, which are provided with oppositely disposed angular faces 36 in lieu of a single angularly disposed face 18. In this form, it will be understood that the fixed rim 10 is likewise provided with projecting members having oppositely disposed angular walls for interengagement with the projecting members 35. At the base of the angularly disposed walls 36, on each side of the projecting members 35, is an inclined wall 37 and a straight wall 38.

Having thus described the invention, what is claimed as new is—

A device of the character described comprising a wheel, a plurality of spaced lugs arranged about and projecting from the periphery of said wheel, each of said lugs having its outer surface formed with an inclined face terminating in a table, the arc of which is parallel to the arc of the wheel, a rim, a plurality of lugs carried upon the inner periphery of said rim and having inwardly disposed inclined faces, each of which terminates in a table, the arc of which is parallel to the arc of the rim and adapted to engage the tables of the lugs carried by the wheel, means for moving the rim circumferentially of the wheel to cause engagement of said inclined faces and table portions of the lugs, and means for preventing circumferential movement of said rim relative to the wheel, as and for the purpose set forth.

LOUIS FRIEDMAN.